No. 647,698. Patented Apr. 17, 1900.
A. C. HACHFIELD.
BICYCLE HANDLE BAR.
(Application filed July 24, 1899.)
(No Model.)
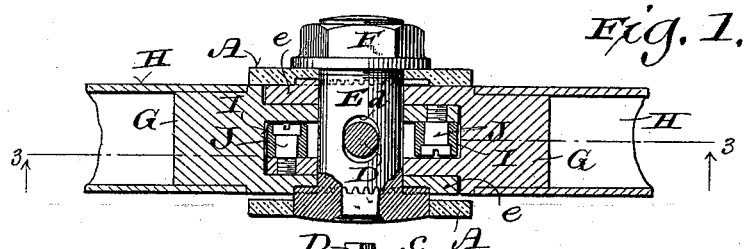
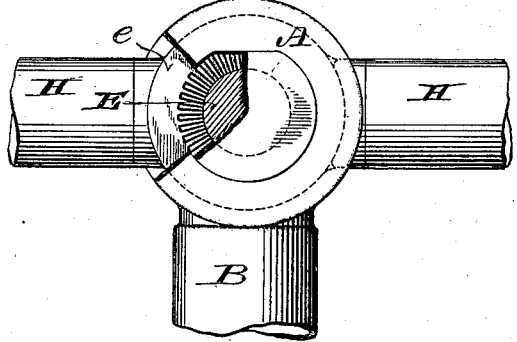
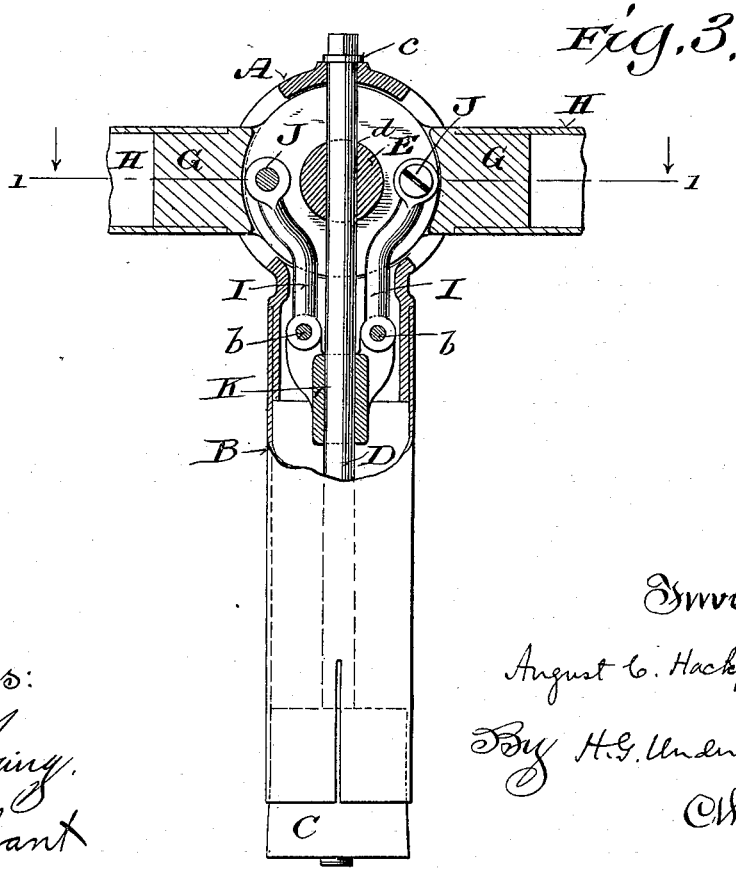

UNITED STATES PATENT OFFICE.

AUGUST C. HACHFIELD, OF MILWAUKEE, WISCONSIN, ASSIGNOR TO HUGO H. CASPER, OF SAME PLACE.

BICYCLE HANDLE-BAR.

SPECIFICATION forming part of Letters Patent No. 647,698, dated April 17, 1900.

Application filed July 24, 1899. Serial No. 724,885. (No model.)

*To all whom it may concern:*

Be it known that I, AUGUST C. HACHFIELD, a citizen of the United States, and a resident of Milwaukee, in the county of Milwaukee and State of Wisconsin, have invented certain new and useful Improvements in Bicycle Handle-Bars; and I do hereby declare that the following is a full, clear, and exact description thereof.

My invention has for its object to provide simple economical bicycle handle-bars having grip members adjustable to various angles, and also to utilize shank-expanders as parts of said handle-bars.

Therefore it consists in certain peculiarities of construction and combination of parts hereinafter particularly set forth, with reference to the accompanying drawings, and subsequently claimed.

Figure 1 of the drawings represents a plan view in horizontal section of a portion of a bicycle handle-bar constructed according to my invention, the plane of the view being indicated by line 1 1 in Fig. 3; Fig. 2, a rear elevation of said portion of the handle-bar as it appears with broken parts; and Fig. 3, a partly-sectional view of said handle-bar, the latter view being indicated by line 3 3 in Fig. 1.

Referring by letter to the drawings, A indicates a metallic shell of annular contour having peripheral openings in opposite directions and provided with a central depending tubular stem $b$, on which is brazed a tube B, the latter being herein shown as longitudinally kerfed at its lower end. The shell A, its stem $b$, and the tube B constitute the shank of my improved bicycle handle-bar.

Arranged in the longitudinally-kerfed lower end of the shank-tube B, I show a conical expander C, and a screw-threaded adjusting-rod D, engaging the expander, extends up through the top of head A aforesaid. The upper end of the expander adjusting-rod is squared to accommodate a wrench and provided with an annular shoulder $c$, that bears against the top of head A, as is common in the art to which my invention relates. Extending through the head A is a central transverse pivot-bolt E, having a longitudinal slot $d$, engaged by the expander adjusting-rod. The head of the bolt is made angular, as clearly shown in Fig. 2, and engages a corresponding aperture in a side of head A, whereby said bolt is held against turning in said head. The screw-threaded end of the bolt is engaged by a, preferably, flanged clamp-nut F outside the head A, and by tightening this nut the hereinafter-described grip members of the handle-bar are held in adjusted position.

Loose on the pivot-bolt inside the head A are rounded forked ends $e$ of fittings G, having stems that extend through the peripheral openings in said head, and brazed on these stems are tubes H, that therewith constitute the grip members of the handle-bar. The forked ends of fittings G are offset, so as to engage one another, as is herein clearly shown, and the outer fork branch of each fitting is provided with exterior radial teeth around the pivot-bolt aperture therein.

The inner surface of one side of the head A is radially toothed around its pivot-bolt aperture to mesh with the corresponding surface of the adjacent outer fork branch of one of the fittings G, and the inner side of the pivot-bolt head is also radially toothed to mesh with a like surface on the adjacent outer fork branch of the other of said fittings.

A pair of links I are connected by pivot-screws J to the inner fork branches of the fittings G, and these links are also in pivotal connection with a cross-head K, loose on the spanner adjusting-rod D, whereby provision is had for unitary pivotal movement of the aforesaid grip members of the handle-bar on the pivot-bolt when it is desirable to vary their angles. The clamp-nut F being loosened sufficient to permit disengagement of the radially-toothed sides of the forked fittings from opposing like surfaces of head A and the head of the pivot-bolt E, simultaneous adjustment of both grip members of the handle-bar to the desired angle within certain limits may be readily effected by lifting or depressing either of said grip members. The adjustment having been accomplished, the opposing radially-toothed surfaces aforesaid are again engaged and the clamp-nut tightened to maintain said adjustment.

While I have shown the handle-bar organized for use in connection with an inside expander, it is practical to organize the same for use with an outside expander or a pinch-collar without departure from the generic scope of my invention.

Having thus described my invention, what I claim as new, and desire to secure by Letters Patent, is—

1. A bicycle handle-bar comprising a hollow head in the form of an annular shell having opposite peripheral openings and the inner face of one of its sides provided with central radial teeth, a transverse pivot-bolt central of the shell and having an angular head fitting in a side of same, this bolt-head being radially toothed upon its inner side, grip members engaging the peripheral openings in said shell and having their inner ends loose on the pivot-bolt, radial teeth on these ends of said grip members in mesh with opposing radially-toothed surfaces of the aforesaid shell and bolt-head, and a clamp-nut run on said bolt.

2. A bicycle handle-bar comprising a hollow head in the form of an annular shell having opposite peripheral openings and the inner face of one of its sides provided with central radial teeth, a transverse pivot-bolt central of the shell and having an angular head fitting in a side of same, this bolt-head being radially toothed upon its inner side, grip members engaging the peripheral openings in said shell and having offset forked ends engaging each other loose on the pivot-bolt, the outer branches of the forks being radially toothed to mesh with opposing radially-toothed surfaces of the aforesaid shell and bolt-head, a clamp-nut run on said pivot-bolt, and links that being in connection at their upper ends with the inner fork branches have their lower ends united and guided in a depending tubular shank of the aforesaid head, whereby provision is had for unitary pivotal movement of the grip members.

3. A bicycle handle-bar comprising a hollow head in the form of an annular shell having opposite peripheral openings and the inner face of one of its sides provided with central radial teeth, a tubular shank depending from the shell and longitudinally kerfed at its lower end, a transverse longitudinally-slotted pivot-bolt central of said shell and having an angular head fitting in a side of same, this bolt-head being radially toothed upon its inner side, an expander in the lower end of the shank, an expander adjusting-rod engaging the pivot-bolt slot and shell-top, grip members engaging the peripheral shell-openings and having offset forked ends engaging each other loose on the pivot-bolt, the outer branches of the forks being radially toothed to mesh with opposing radially-toothed surfaces of the bolt-head and shell, and a clamp-nut run on said pivot-bolt.

4. A bicycle handle-bar comprising a hollow head in the form of an annular shell having opposite peripheral openings and the inner face of one of its sides provided with central radial teeth, a tubular shank depending from the shell and longitudinally kerfed at its lower end, a transverse longitudinally-slotted pivot-bolt central of said shell and having an angular head fitting in a side of same, this bolt-head being radially toothed upon its inner side, an expander in the lower end of the shank, an expander adjusting-rod engaging the pivot-bolt slot and shell-top, grip members engaging the peripheral shell-openings and having offset forked ends engaging each other loose on the pivot-bolt, the outer branches of the forks being radially toothed to mesh with opposing radially-toothed surfaces of the aforesaid shell and bolt-head, a cross-head loose on the expander adjusting-rod, links connecting the inner fork branches of the grip members with the cross-head, and a clamp-nut run on said pivot-bolt.

In testimony that I claim the foregoing I have hereunto set my hand, at Milwaukee, in the county of Milwaukee and State of Wisconsin, in the presence of two witnesses.

AUGUST C. HACHFIELD.

Witnesses:
N. E. OLIPHANT,
B. C. ROLOFF.